(12) United States Patent
Servedio et al.

(10) Patent No.: US 8,972,307 B1
(45) Date of Patent: Mar. 3, 2015

(54) METHOD AND APPARATUS FOR MACHINE LEARNING

(75) Inventors: Rocco Servedio, New York, NY (US); Philip Michael Long, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 566 days.

(21) Appl. No.: 13/281,045

(22) Filed: Oct. 25, 2011

Related U.S. Application Data

(60) Provisional application No. 61/535,138, filed on Sep. 15, 2011.

(51) Int. Cl.
*G06N 99/00* (2010.01)
*G06K 9/62* (2006.01)

(52) U.S. Cl.
CPC ............ *G06N 99/005* (2013.01); *G06K 9/6257* (2013.01)
USPC .......................................................... 706/12

(58) Field of Classification Search
CPC .. G06N 99/005; H04L 12/585; G06K 9/6256; G06K 9/6257
See application file for complete search history.

(56) References Cited

U.S. PATENT DOCUMENTS

| | | | |
|---|---|---|---|
| 8,364,617 B2 * | 1/2013 | Laxman et al. .................. | 706/20 |
| 2008/0177680 A1 * | 7/2008 | Laxman et al. .................. | 706/12 |
| 2008/0270329 A1 * | 10/2008 | Long et al. ..................... | 706/12 |
| 2009/0192955 A1 * | 7/2009 | Tang et al. ...................... | 706/12 |
| 2009/0287618 A1 * | 11/2009 | Weinberger et al. ............ | 706/10 |
| 2012/0011113 A1 * | 1/2012 | Cohen et al. ................... | 707/723 |

OTHER PUBLICATIONS

Ruta et al, Analysis of the correlation between majority voting error and the diversity measures in multiple classifier systems, 2001.*
Ruta et al, Classifier selection for majority voting, 2004.*
Aslam, J., and Decatur, S. Specification and simulation of statistical query algorithms for efficiency and noise tolerance. Journal of Computer and System Sciences, 56:191-208, 1998.
Auer, P. and Cesa-Bianchi, N. On-line learning with malicious noise and the closure algorithm. Annals of Mathematics and Artificial Intelligence, 23:83-99, 1998.
Block, H. The Perceptron: a model for brain functioning. Reviews of Modern Physics, 34:123-135, 1962.
Blum, A. Random Projection, Margins, Kernels, and Feature-Selection. In LNCS vol. 3940, pp. 52-68, 2006.
Blum, A. and Balcan, M.-F. A discriminative model for semi-supervised learning. JACM, 57(3), 2010.
Decatur, S. Statistical queries and faulty PAC oracles. In Proc. 6th COLT, pp. 262-268, 1993.

(Continued)

*Primary Examiner* — Jeffrey A Gaffin
*Assistant Examiner* — Mikayla Chubb
(74) *Attorney, Agent, or Firm* — Young Basile Hanlon & MacFarlane P.C.

(57) ABSTRACT

A computationally efficient method and apparatus is disclosed for machine learning an unknown, n-dimensional $\gamma$-margin halfspace to accuracy $1-\epsilon$ in the presence of malicious noise, when the noise rate is allowed to be as high as $$\Theta(\epsilon\gamma\sqrt{\log(1/\gamma)}).$$

A smooth boosting module repeatedly calls a weak learner module that generates candidate classifiers based on a majority vote of randomly-generated classifiers.

21 Claims, 7 Drawing Sheets

(56) References Cited

OTHER PUBLICATIONS

Domingo, C. and Watanabe, O. MadaBoost: a modified verson of AdaBoost. COLT, 2000.

Feldman, V., Gopalan, P., Khot, S., and Ponnuswami, A. On agnostic learning of parities, monomials, and halfspaces. Siam J. Comput., 39(2):606-645, 2009.

Feller, W. Generalization of a probability limit theorem of Cramer. Trans. Am. Math. Soc., 54:361-372, 1943.

Freund, Y. and Schapire, R. Large margin classification using the Perceptron algorithm. In Proc. 11th COLT, pp. 209-217., 1998.

Freund, Y. and Schapire, R. A short introduction to boosting. J. Japan. Soc. Artif. Intel., 14 (5):771-780, 1999.

Gavinsky, D. Optimally-smooth adaptive boosting and application to agnostic learning. JMLR, 4:101-117, 2003.

Gentile, C. and Littlestone, N. The robustness of the p-norm algorithms. In Proc. 12th COLT, pp. 1-11, 1999.

Guruswami, V. and Raghavendra, P. Hardness of learning halfspaces with noise. SIAM J. Comput., 39(2):742-765, 2009.

Kearns, M. and Li, M. Learning in the presence of malicious errors. SIAM Journal on Computing, 22(4):807-837, 1993.

Khardon, R. and Wachman, G. Noise tolerant variants of the perceptron algorithm. JMLR, 8:227-248, 2007.

Klivans, a., Long, P. and Servedio, R. Learning Halfspaces with Malicious Noise. JMLR, 10:2715-2740, 2009.

Long, P. and Servedio, R. Random classification noise defeats all convex potential boosters. Machine Learning, 78 (3):287-304, 2010.

Mansour, Y. and Parnas, M. On Learning Conjunctions with Malicious Noise, Computer Science Department, Tel-Aviv University, Date Unknown, 6 pp.

Rosenblatt, F. The Perceptron: a probabilistic model for information storage and organization in the brain. Psychological Review, 65:386-407, 1958.

Servedio, R. Smooth boosting and learning with malicious noise. JMLR, 4:633-648, 2003.

Shawe-Taylor, J., Bartlett, P., Williamson, R. and Anthony, M. Structural risk minimization over data-dependent hierarchies. IEEE Transactions on Information Theory, 44(5):1926-1940, 1998.

Valiant, L., Learning Disjunctions of Conjunctions. In Proc. 9th IJCAI, pp. 560-566, 1985.

Schapire, Robert E., The Boosting Approach to Machine Learning an Overview, MSRI Workshop on Nonlinear Estimation and Classification, 2002 (23 pp).

\* cited by examiner

| EXAMPLE | FREE! | 50% OFF! | DEAR | CLICK HERE | CALL NOW! | ... | SUBSCRIBE | LABEL |
|---|---|---|---|---|---|---|---|---|
| $x_1$ | 0 | 0 | 1 | 0 | 1 | ... | 1 | SPAM |
| $x_2$ | 0 | 0 | 1 | 1 | 0 | ... | 0 | NON-SPAM |
| $x_3$ | 1 | 1 | 1 | 1 | 1 | ... | 0 | NON-SPAM |
| $x_4$ | 1 | 1 | 0 | 1 | 1 | ... | 0 | SPAM |
| ... | ... | ... | ... | ... | ... | ... | ... | ... |
| $x_{N-1}$ | 1 | 1 | 0 | 1 | 1 | ... | 0 | SPAM |
| $x_N$ | 1 | 1 | 0 | 1 | 1 | ... | 0 | SPAM |

FIG. 3

|  | FREE! | 50% OFF! | DEAR | CLICK HERE | CALL NOW! | SUBSCRIBE | |
|---|---|---|---|---|---|---|---|
| $V_1$ | 0.2 | -0.8 | 0.5 | 0.3 | -0.3 | 0.4 | — 52a |
| $V_2$ | 0.1 | 0.7 | 0.6 | -0.2 | 0.4 | -0.8 | — 52b |
| $V_3$ | 0.9 | 0.9 | -0.8 | 0.2 | -0.3 | 0.4 | — 52c |
| $V_4$ | 0.6 | 0.5 | 0.0 | 0.3 | 0.8 | 0.0 | — 52d |
| $V_{k-1}$ | 0.2 | 0.4 | -0.8 | -0.5 | 0.9 | 0.3 | — 52e |
| $V_k$ | 0.9 | -0.2 | 0.5 | 0.0 | 0.0 | 0.7 | — 52f |
|  | 54a | 54b | 54c | 54d | 54e | 54f |  |

FIG. 4

METHOD AND APPARATUS FOR MACHINE LEARNING

CROSS-REFERENCE TO RELATED APPLICATIONS

This application claims priority to U.S. Provisional Patent Application No. 61/535,138, filed Sep. 15, 2011, which is hereby incorporated by reference in its entirety.

TECHNICAL FIELD

The present invention relates to the field of machine learning generally and in particular to machine learning using parallel processing.

BACKGROUND

Machine learning seeks to permit computers to analyze known examples that illustrate the relationship between outputs and observed variables. One such approach is known as Probably Approximately Correct learning or "PAC" learning. PAC learning involves having a machine learner receive examples of things to be classified together with labels describing each example. Such examples are sometimes referred to as labeled examples. The machine learner generates a prediction rule or "classifier" (sometimes referred to as a "hypothesis") based on observed features within the examples. The classifier is then used to classify future unknown data with an acceptable rate of error. For example, one application of machine learning is filtering spam from legitimate email. The labeled examples might include large number of emails, both spam and non-spam. Each email contains one or more features in the form of the occurrence or non-occurrence of certain words and phrases such as "Buy Now!" Each instance of data is given a label such as "spam" or "non-spam." The goal of machine learning is to process the labeled examples to generate classifiers that will correctly classify future examples as spam or non-spam, at least within an acceptable error rate.

A boosting algorithm is one approach for using a machine to generate a classifier. Various boosting algorithms are known, for example, MadaBoost and AdaBoost. Boosting algorithms in some cases involve repeatedly calling a weak learner algorithm to process a subset of labeled examples. These subsets are drawn from the larger set of labeled examples using probability distributions that can vary each time the weak learner is called. With each iteration, the weak learner algorithm generates a crude or weak classifier that is not especially accurate. The boosting algorithm combines the weak classifiers generated by the weak algorithm. The combination of weak classifiers constitutes a single prediction rule that should be more accurate than any one of the weak classifiers generated by the weak learner algorithm.

SUMMARY

Disclosed herein are embodiments of techniques for machine learning. One aspect of the disclosed embodiments is a technique for generating a classifier from examples in a dataset containing malicious noise. The technique includes storing in a computer memory at least one of the examples of the dataset and generating a plurality of candidate classifiers. At least some of the plurality of candidate classifiers include a majority vote over a plurality of randomly-generated classifiers. This majority vote is taken with regard to the example stored in the computer memory. A boosted classifier is generated. The boosted classifier incorporates at least some of the plurality of candidate classifiers.

Another aspect of the disclosed embodiments is a machine for generating a classifier from examples in a dataset containing malicious noise. The machine includes a memory containing at least one of the examples of the dataset and a processor. The processor is programmed to execute a boosting module. The boosting module repeatedly calls a weak learner module that generates a plurality of weak classifiers selected from a plurality of candidate classifiers. Some of the plurality of candidate classifiers comprise a majority vote over a plurality of randomly-generated classifiers. This vote is taken with regard to the example stored in the memory. The processor generates a classifier that incorporates at least some of the plurality of weak classifiers.

Another aspect of the disclosed embodiments is a computer-readable medium storing a program of instructions executable by a machine for generating a classifier from examples in a dataset containing malicious noise. The program causes the machine to store in a computer memory at least one of the examples of the dataset and to repeatedly call a weak learner module. The weak learner module generates as output a plurality of weak classifiers selected from a plurality of candidate classifiers. At least some of the plurality of candidate classifiers comprise a majority vote over a plurality of randomly-generated classifiers. This vote is taken with regard to the example stored in the computer memory. At least some of the weak classifiers are selected from a plurality of candidate classifiers based on the error rate realized using the selected candidate classifier to classify a set of examples drawn from the dataset. A boosted classifier is generated that incorporates at least some of the plurality of weak classifiers.

BRIEF DESCRIPTION OF THE DRAWINGS

The description herein makes reference to the accompanying drawings wherein like reference numerals refer to like parts throughout the several views, and wherein:

FIG. 3 is a dataset of labeled examples accepted as input according to an embodiment of the described subject matter;

FIG. 4 is a table of randomly-generated classifiers $h_1, \ldots, h_k$ generated by module $A_k$ in according to an embodiment of the described subject matter;

DETAILED DESCRIPTION

In the embodiments below, a method (and an apparatus for implementing the method) is disclosed for machine learning using a set of labeled examples x drawn from an unknown, n-dimensional, γ-margin halfspace. In one embodiment, an example set includes examples of emails, each having various features and each being labeled as "spam" or "non-spam" based on those features. Other disclosed embodiments are not limited to use in classifying emails and can be implemented with other kinds of example sets. The example set may include noise such as malicious noise at a rate of $\eta$. Malicious noise can include examples that are incorrectly labeled and thus can tend to mislead the machine learner, resulting in classifiers that generate too many erroneous results. Some conventional machine learning approaches can tolerate some malicious noise without significant degradation, but only to a point. For example, some conventional approaches learn to accuracy $1-\epsilon$ if the malicious noise rate $\eta$ does not exceed $\epsilon/(1+\epsilon)$. For example, the Perceptron method for learning a γ-margin halfspace can learn γ-margin halfspaces to accuracy $1-\epsilon$ in the presence of malicious noise provided that the malicious noise rate $\eta$ is at most some value $\Theta(\epsilon\gamma)$.

Figure 1:
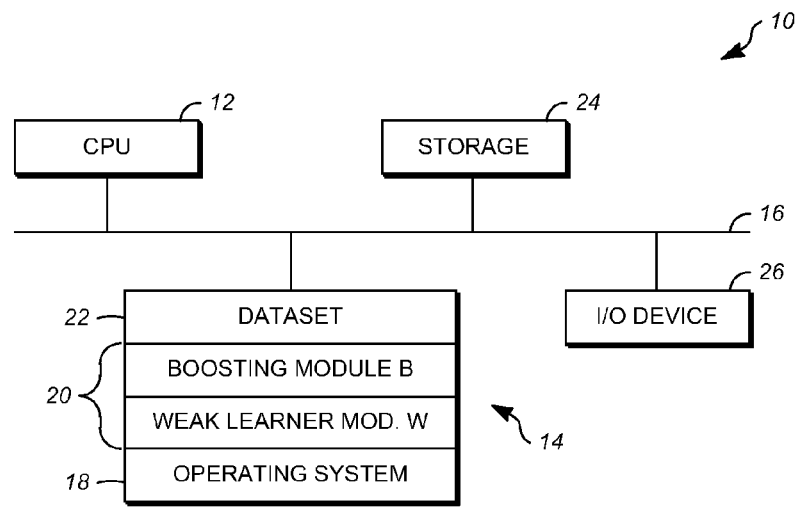
FIG. 1 is a block diagram of an example machine learning implementation according to an embodiment of the described subject matter.

FIG. 1 is a block diagram of a machine learning system 10. Machine learning system 10 can be a programmed general purpose computer which includes a processor 12 and a memory 14. Processor 12 is a conventional central processor but can be any other type of device capable of manipulating or processing information now-existing or hereafter developed, including for example optical processors, quantum processors and/or molecular processors, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination.

Memory 14 is random access memory (RAM) although any other suitable type of storage device can be used. Memory 14 includes code and data that is accessed by processor 12 using a bus 16. Memory 14 includes an operating system 18, application programs 20 (including programs that permit processor 12 to perform the methods described herein such as boosting module B and weak learner module W), and data 22 (including, in some cases, the dataset examples used for machine learning and the classifiers generated as a result of machine learning). Machine learning system 10 also includes secondary storage 24, which can be a disk drive. Because the example sets used for machine learning contain a significant amount of information, the example sets can be stored in whole or in part in secondary storage 24 and loaded into memory 14 as needed for processing. Machine learning system 10 includes input-output device 26, which is also coupled to processor 12 via bus 16. Input-output device 26 can be a display or other human interface device that permits an end user to program and otherwise use machine learning system 10.

Although FIG. 1 depicts that processor 12 and memory 14 are integrated into a single unit, this depiction is exemplary only. The operations of processor 12 can be distributed across multiple processors such as parallel processors, which can be coupled directly or across a local area or other network. Memory 14 can be distributed across multiple machines such as a network-based memory or memory in multiple machines performing the operations of machine learning system 10. Although depicted here as a single bus, bus 16 can be composed of multiple buses. Storage 24 can be directly coupled to the other components of machine learning system 10 or can be accessed via a network and can comprise a single integrated unit such as a disk drive or multiple units such as an array of disk drives. Machine learning system 10 can thus be implemented in a wide variety of configurations.

One of the functions of machine learning system 10 is to automatically generate classifiers that permit machine learning system 10 or another computer to programmatically determine the correct label of a specimen. The classifiers are generated using a dataset such as a dataset of labeled examples. In one illustrative application, machine learning system 10 is used to develop a classifier to distinguish unsolicited or spam emails from legitimate emails. Other examples of machine learning applications include without limitation machine vision and other machine perception, language processing, pattern recognition including face recognition and handwriting recognition; medical diagnosis, search engines, human-machine interfaces, bioinformatics; detection of fraud; financial and accounting analysis including analysis of markets; face recognition; robotics and games. The classifiers developed by machine learning system 10 can be deployed in programmed general purpose computers or special purpose devices to render functions in any of the foregoing or other areas.

Figure 2:
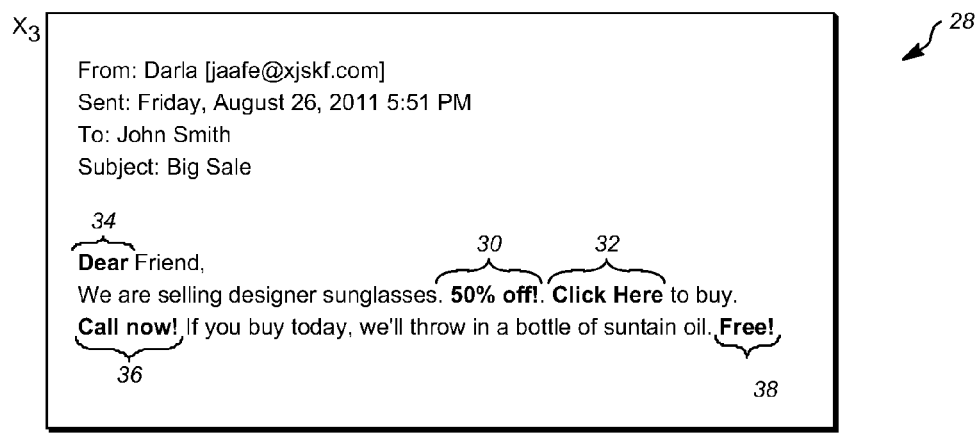
FIG. 2 is an specimen of an email used to create one of the examples in a dataset of labeled examples according to an embodiment of the described subject matter.

In this example, machine learning system 10 is used to generate a classifier for distinguishing spam from non-spam emails. FIG. 2 is a specimen of an email 28 used to create one of the examples ($x_3$ in FIG. 3) in a dataset of N labeled examples ($x_1, \ldots, x_N$ in FIG. 3) that machine learning system 10 will learn. In practice, a dataset of training examples can be created by having humans review specimens such as email 28 and manually categorize the email with a label, which in this case is "Spam" or "Non-Spam."

The text of an email such as email 28 has certain features, which in this case correspond to the presence or absence of particular text. For example, email 28 has the strings "50% off!" 30, "Click here" 32, "Dear" 34, "Call now!" 36 and "Free!" 38. These features are associated with the categorization of email 28 as "Spam" or "Non-Spam." Many emails can be studied classified and the results can be summarized in a dataset of training examples such as that shown in FIG. 3.

FIG. 3 is a table or dataset 40 of N labeled examples. In practice, dataset 40 contains a large number of examples such as 10,000 to 1,000,000 examples $x_1, \ldots, x_N$. Dataset 40 includes rows 42a through 42f (sometimes referred to generally as rows 42), each containing a different one of example $x_1, \ldots, x_N$. Columns 44a through 44f (sometimes referred to generally as columns 44) of dataset 40 indicate features that may be found in each example. Features in this illustration indicate the existence ("1") or non-existence ("0") of particular text strings such as "Free!" (column 44a), "50% off! (column 44b), "Dear" (column 44c), "Click Here" (column 44d), "Call now!" (column now 44e), "Subscribe" (column 44f). Column 46 indicates the label assigned to each example, such as "Spam" or "Non-Spam." Thus, each example x is a vector whose elements are a sequence of values (0,1) indicating the existence or nonexistence in that example of a particular feature.

For example, row 42c of dataset 40 contains the values of example $x_3$. Example $x_3$ is a vector (1,1,1,1,1,0) whose elements indicate the presence ("1") or absence ("0") of particular features. Thus, column 44a of row 42c contains a "1" indicating that example $x_3$ includes the feature of having the text "Free!" This is consistent with specimen email 28 (FIG. 2) which shows the email contained the text "Free!" Of note in this case is that the value of column 46 in row 42c indicates that the label "Non-Spam" is assigned to example $x_3$. Most human reviewers would categorize email 28 of FIG. 2 as "Spam" and thus the indication of example $x_3$ as "Non-Spam" is an error or noise. Moreover, the error can be described as malicious noise because it may lead machine learning system 10 to create classifiers that generate too many erroneous results.

Machine learning system 10 accepts as input training examples such as dataset 40 and generates as output a classifier which can be used to predict the proper label of new data. The operation of machine learning system 10 is explained below in detail; however, in general terms machine learning system 10 executes a boosting module B (described below in connection with FIG. 5). Boosting module B operates by repeatedly calling a weak learner module W (described below in connection with FIG. 6). Weak learner module W in turn makes l calls to a module $A_k$. In one exemplary embodiment, module $A_k$ generates k random vectors each time module $A_k$ is invoked. The k random vectors are used to formulate crude classifiers ($h_1, \ldots, h_k$). Each time module W calls $A_k$, module W stores a classifier H that is a majority vote of the classifiers $h_1, h_k$. Thus after l iterations of calling $A_k$, module W will have generated hypotheses $H_1, \ldots, H_l$. Weak learner module W selects as its output $H_j$, which is that one of hypotheses $H_1, \ldots, H_l$ that generates the most accurate results across a dataset of labeled examples drawn using a specified probability distribution $P_t$. Module B incorporates the selected hypotheses $H_j$ into an overall classifier whose accuracy improves with each iteration of W.

To facilitate further explanation of the operation of W and $A_k$, certain mathematical concepts and notations are now introduced. The goal of machine learning system 10 can be expressed mathematically as an attempt to learn a target function, $f(x) = \text{sign}(w \cdot x)$. This target function is an unknown, origin-centered halfspace over the domain $R^n$, where x is an example the set of examples drawn from the dataset requiring classification, w is an ideal weight vector that is unknown to machine learning system 10, and $R^n$ is the domain of n features in which the examples x subsist.

The operation of module $A_k$ is now described. In this illustrative embodiment, each time $A_k$ is invoked, it generates k independent uniform random unit vectors $v_1, \ldots, v_k$ in $R^n$. The value of k is set in this case to $\log(1/\gamma)$. Other values of k can be used. The variable k can be described as the cardinality of (i.e., the number of) unit vectors v. Generally speaking, so long as k is not too large, then module $A_k$ has a non-negligible chance of outputting a reasonably accurate weak hypothesis. The random unit vectors are used to compute random origin-centered halfspaces $h_1 \ldots h_k$, where $h_1 = \text{sign}(v_1 \cdot x)$ and $h_k = \text{sign}(v_k \cdot x)$.

Thus, halfspaces $h_1, \ldots, h_k$ are generated each time $A_k$ is invoked, and each one of halfspaces $h_1, \ldots, h_k$ is essentially a crude classifier based on unit vectors $v_1, \ldots, v_k$. FIG. 4 is a table of unit vectors $v_1, \ldots, v_k$ generated by module $A_k$. Rows 52a through 52d of table 50 contain the values of unit vectors $v_i$. These values are shown in columns 54a through 54f (sometimes referred to generally as columns 54). Columns 54 correspond to the features of the examples in dataset 40 as indicated by the textual legends at the top of each of columns 54. For example, row 52c contains unit vector $v_3$, whose elements (0.9, 0.9, −0.8, 0.2, −0.3, 0.4) are in columns 54. When $v_3$ is applied to an example in the set of examples (such as examples $x_1, \ldots, x_N$ in FIG. 3), each element of the unit vector $v_3$ will be multiplied by the corresponding element of the examples, such as in the following illustration which depicts the vector multiplication of $v_3$ and $x_1$:

$$(0.9, 0.9, -0.8, 0.2, -0.3, 0.4) \times (0, 0, 1, 0, 1, 1)$$

In effect the values of the unit vectors are weights to be applied to each feature value of the relevant example. Thus, where an example x lacks a feature, its element corresponding to that feature will have a value of "0" which, when multiplied by the corresponding element of the unit vector, yields a product of zero. Where an example x has a feature, its element corresponding to that feature will have a value of "1" which, when multiplied by the corresponding element of the unit vector v, yields a product equal to the corresponding element of the unit vector v.

Figure 5:
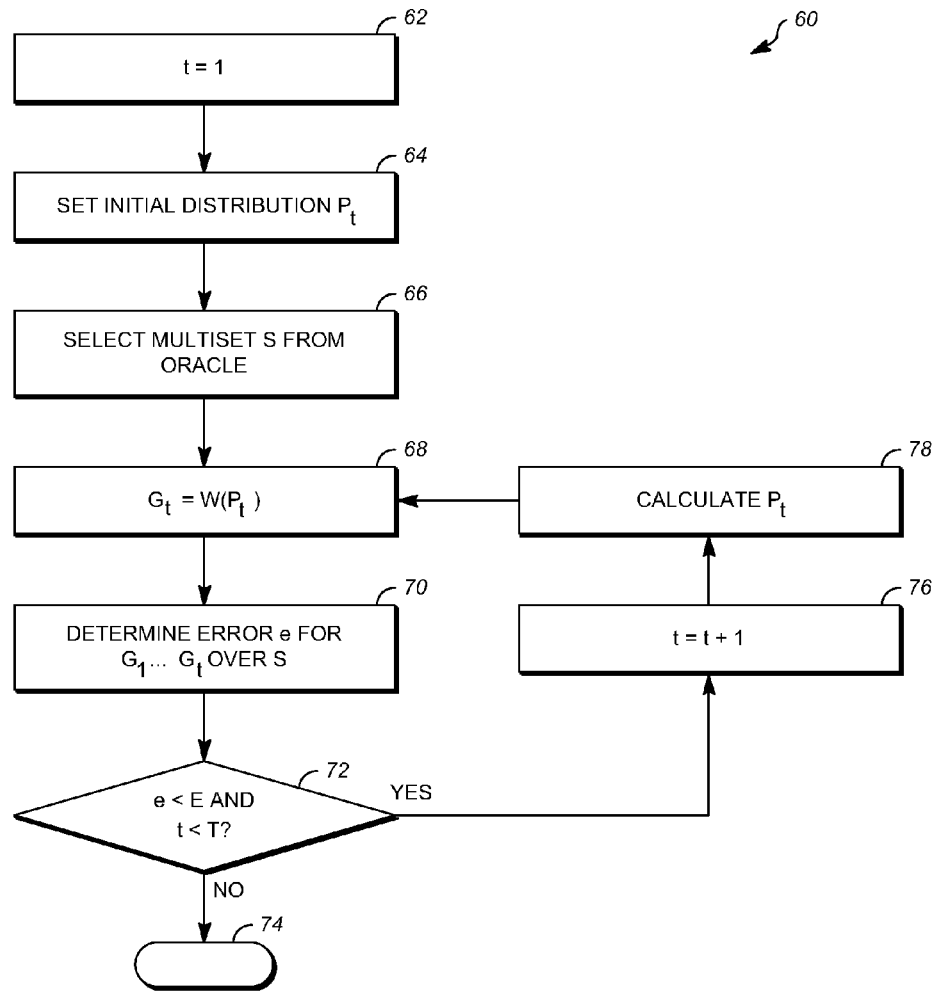
FIG. 5 is a logic flow diagram showing the operation of a module B according to an embodiment of the described subject matter.
Figure 6:
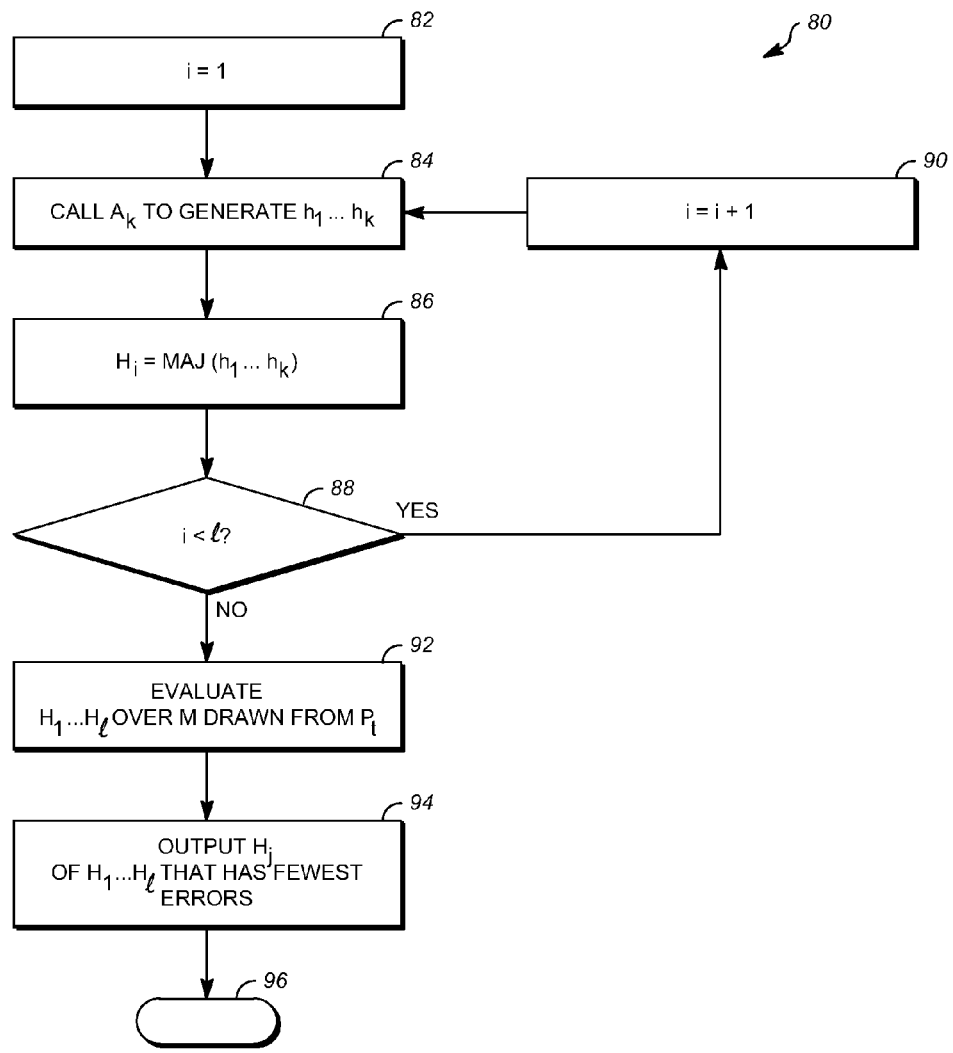
FIG. 6 is a logic flowchart showing the operation of a module W according to an embodiment of the described subject matter.

Turning to FIGS. 5 and 6, the operation of modules B and W are further explained. FIG. 5 is a logic flow chart of a method of operation 60 of module B. At a block 62, module B sets variable t equal to one. At a block 64, module B sets an initial distribution $P_{t=1}$ over labeled examples to be uniform over S, a multiset of examples to be drawn from the dataset 40 of examples shown in FIG. 2. At a block 66, module B draws (sampling with replacement) a multiset S of m examples from the noisy example oracle $EX_\eta(f, D)$. Noisy example oracle $EX_\eta(f, D)$ which is a function of $f$, the unknown function that describes the relationship between features and labels, and D an unknown distribution of examples. The embodiments are not limited to use with a noisy example oracle but this particular tool is useful to mathematically verify the efficacy of the disclosed embodiments. When the noisy example oracle $EX_\eta(f, D)$ is invoked, the oracle will—with probability $1-\eta$—output examples x from D and outputs a labeled example $(x, f(x))$; and the oracle will—with probability $\eta$—output a "noisy" labeled example which may be an arbitrary element $(x', y)$. Noisy examples need not satisfy the margin constraint and can lie arbitrarily close to, or on, the hyperplane $w \cdot x = 0$.

The value of m can be selected at block 66 to provide a sufficient number of examples to verify the accuracy of the candidate hypothesis generated by module B. In some embodiments, m is determined as a polynomial function of $(n, 1/\gamma, 1/\epsilon)$.

At a block 68, module B calls or invokes module W to process examples in multiset S for distribution $P_t$. The operation of module W is explained below in connection with FIG. 6. Module W generates candidate classifiers $H_1, \ldots, H_l$ and returns as output the classifier $H_j$ from that group that makes the fewest errors over the dataset M (defined below) along with the error rate of that candidate classifier. Module B stores the classifier $H_j$ (returned by module W) as element $G_t$ in an array or list of classifiers $G_1, \ldots, G_N$, where N is the final number of iterations or rounds that module B executes. Note that on the first iteration of module B, the array or list of classifiers $G_1, \ldots, G_N$ will be empty and $G_{t=1}$ will be the first classifier added to the array. Thus with each successive iteration of module B, module W is called and outputs a new member $G_t$ of a growing array or list of classifiers $G_1, \ldots, G_{t-1}$.

At a block 70, module B combines the classifiers in the array or list of classifiers $G_1, \ldots, G_t$ to provide an overall boosted or target classifier $G_B$, and determines the error rate e of that overall boosted or target classifier $G_B$ over multiset S. This combination of classifiers can be effected by taking a majority vote of the classifiers or by calculating a weighted average, where the most accurate one of classifiers $G_1, \ldots, G_t$ (based on the output of module W) receives the greatest weight. The specific combination depends on the type of boosting algorithm employed by module B. In this case, a MadaBoost algorithm is used. Other boosting algorithms may be used, including algorithms that generate smooth distributions.

At a block 72, module B determines if the error rate e of classifier $G_B$ is below a threshold E and whether t is below a threshold T (the maximum number of iterations that module B will run). If the error rate e is at or above threshold E or if t is at or above threshold T, then processing of module W can terminate at a block 74. If the error rate e is below threshold E and t is below threshold T, then module B increments variable t by one at a block 76. In some embodiments, block 72 can ignore error e and terminate or continue processing based on the value of t. At a block 78, module B calculates a new probability distribution $P_t$. In this example, the distribution $P_t$ over labeled examples is K-smooth so that $P_t[(x,y)] \leq 1/kP[(x,y)]$ for every (x,y) in the support of P. The specific calculation of $P_t$ can depend on the type of boosting algorithm that is used. In this case, MadaBoost is used. MadaBoost can select a distribution $P_t$ to more heavily weight examples that were most often misclassified by previous iterations of $G_{i<t}$ or by the constituent classifiers $H_j$. Processing then continues to block 68, where module B calls module W using the updated probability distribution $P_t$. Subsequent processing continues as described above in connection with blocks 70 through 78.

FIG. 6 is a logic flowchart illustrating a method of operation 80 of module W. As explained above, module W is a weak learner module and is called by module B at block 68 of FIG. 5. At a block 82, module W sets variable i equal to one. At a block 84, module W calls module $A_k$, which is described above. Each time it is called, module $A_k$ returns random origin-centered halfspaces $h_1, \ldots, h_k$. Each halfspace $h_i$=sign$(v_i \cdot x)$ generated by module $A_k$ can be computed with respect to an example (such as one of examples $x_1, \ldots, x_N$ in FIG. 3) and the sign of the resulting product can be used to determine the predicted label (e.g., −1 is associated with "Non-Spam" and +1 is associated with "Spam"). Alternatively, the resulting product can be compared to a threshold. If the product exceeds the threshold, then the example can be assigned a label (such as "Spam"). If the product does not exceed the threshold, then the example can be assigned a different label (such as "Non-Spam"). Halfspaces $h_1, \ldots, h_k$ can in some embodiments be used as classifiers and can be aggregated together to create a combined candidate classifier $H_i$ whose output is equal to the label determined with respect to a given example by the majority of halfspaces $h_1, \ldots, h_k$. At block 86, module W stores candidate classifier $H_i$, which can be expressed mathematically as:

$$H(x) = Maj(sign(v_1 \cdot x), \ldots, sign(v_k \cdot x)) = Maj(h_1, \ldots, h_k)$$ (Equation 1)

At a block 88, a determination is made as to whether i is less than l. In this case, the value of l is 1000. The value l can be thought of as the number of members or cardinality of the set of classifiers $H_1, \ldots, H_l$. Other suitable values of l can be used. If i is less than l, then at block 90, module W increments the variable i by one. Processing continues at block 84 where module W again calls module $A_k$. Subsequent processing continues as described above in connection with blocks 84 through 90.

If, at block 88, i is not less than l, then processing continues to a block 92. At block 92, module W evaluates the classifiers $H_1, \ldots, H_l$ over a set of M examples drawn from the dataset 40 using probability distribution $P_t$. The value of M can be selected to provide sufficient numbers of examples to test accuracy of classifiers. Typical ranges of M include 1,000 to 100,000. Distribution $P_t$ is computed by module B as explained above and passed to module W when module W is called at block 68 of FIG. 5. As explained above, each of classifiers $H_1, \ldots, H_l$ can render a classification output (e.g., "spam" or "no spam") for a particular example by applying its constituent classifiers $h_1, \ldots, h_k$ and selecting as the classification output the classification determined by a majority of the constituent classifiers $h_1, \ldots, h_k$. The classifier $H_j$ that classifies the examples M with the fewest errors is returned to module B as the output of module W at block 68 of FIG. 5.

Figure 7:
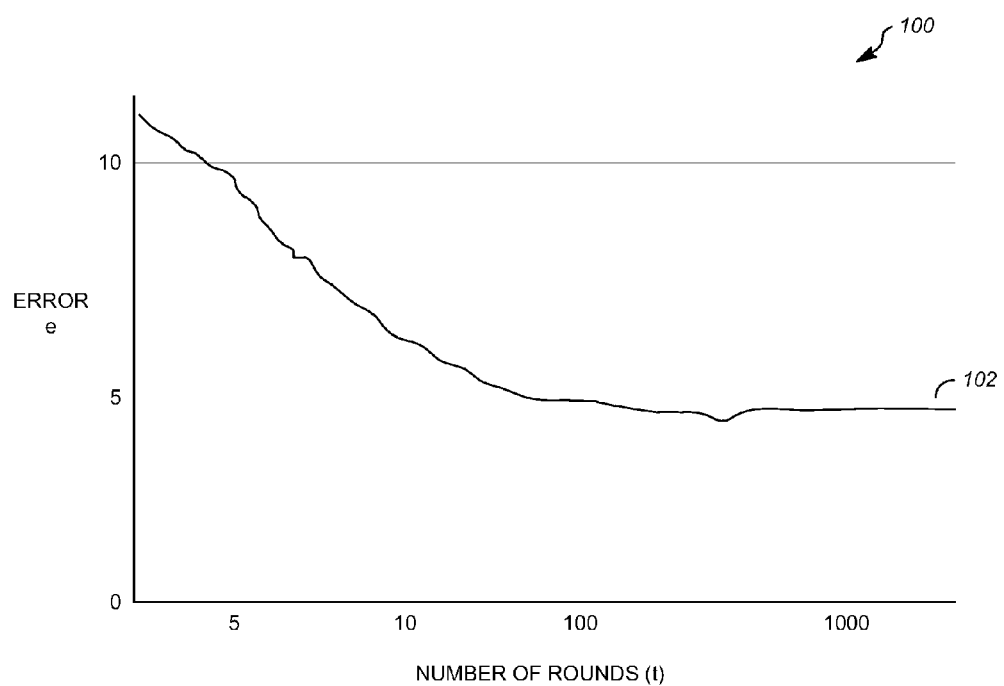
FIG. 7 is a graph of error rate verses the iterations of the module B according to an embodiment of the described subject matter.

The performance of module B (FIG. 5) is now explained with reference to FIG. 7. FIG. 7 is a graph 100 showing the error rate e of classifier $G_B$ verses iterations or rounds (t) of module B. The error rate e decays towards a theoretical minimum as the number of rounds increases. A line 102 illustrates the value of threshold E that can be used at block 72 of FIG. 5 to determine when to terminate processing of module B. In some embodiments, the ultimate error rate e achieved by the disclosed embodiments can be lower than conventional systems because, in some cases, a smooth boosting algorithm does not amply malicious noise (or any other example weight) by more than a 1/ϵ factor. Weak learner module W can achieve a higher advantage than 1/ϵ so that boosting by module B achieves acceptable error rates even in presence of more malicious noise. Note that module W and module $A_k$ generates $h_1, \ldots, h_k$ with random numbers (not necessarily with examples x) and thus malicious noise might not affect the values of $h_1, \ldots, h_k$ in every case.

Figure 8:
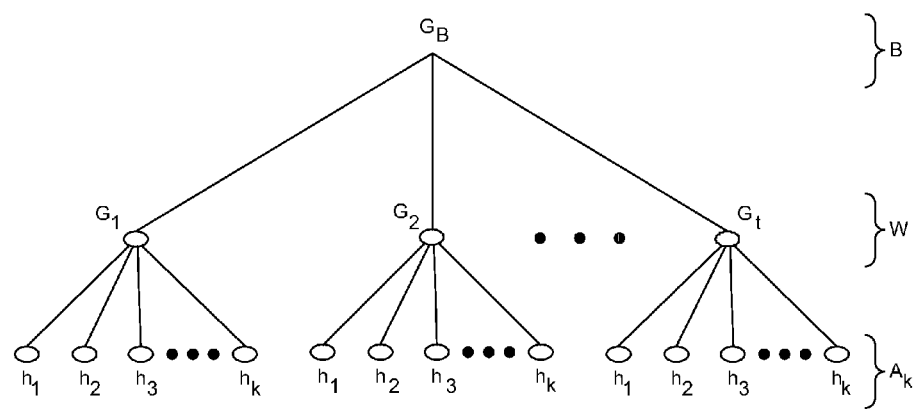
FIG. 8 is a schematic illustrating classifiers generated by modules $A_k$, W and B according to an embodiment of the described subject matter.

Referring to FIG. 8, the hierarchical relationship between the outputs of modules $A_k$, W and B is explained. The output of each iteration of $A_k$ includes randomly-generated classifiers $h_1, \ldots, h_k$. Module W invokes module $A_k$ l times and with each iteration generates a candidate classifier H that is the majority vote of the classifiers $h_1, \ldots, h_k$ generated during that invocation of module $A_k$. W outputs as weak classifier $H_1$ that one of candidate classifiers $H_1, \ldots, H_l$ that produces the least error. Module B includes the successive outputs of W in an array $G_B$ of classifiers $G_1, \ldots, G_t$. The final output of module B is $G_B$, which can be described as the boosted or target classifier used to classify future examples. The terms "boosted" and "target" as applied to classifier $G_B$ are used as labels for convenience to distinguish $G_B$ from constituent classifiers $G_1, \ldots, G_t$ and do not impart any other limiting meaning.

The techniques described herein can permit computationally efficient machine learning to an to accuracy 1−ϵ in the presence of malicious noise. In some embodiments, the noise rate can be as high as $$\Theta(\epsilon\gamma\sqrt{\log(1/\gamma)}).$$

The disclosed techniques can execute in a running time that is a polynomial function of n, γ, and ϵ. In some cases, the polynomial function can be expressed as poly(n, 1/γ, 1/ϵ). Some previous computationally efficient methods could only learn to accuracy ϵ in the presence of malicious noise of a rate that is at most Θ(ϵγ), so that the disclosed embodiments more effectively tolerate malicious noise.

The functions of modules B, W or $A_k$ individually or collectively can be incorporated as application computer programs stored in memory 14 of machine learning system 10 (FIG. 1). Alternatively, the logic of modules B, W or $A_k$ individually or collectively can be implemented in hardware such as in firmware or on an ASIC or other specialized chip. All or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

The invention claimed is:

1. A computer-implemented method for generating a classifier from examples in a dataset containing malicious noise, comprising:
    storing in a memory at least one of the examples of the dataset, wherein the at least one examples stored in the memory contains malicious noise;
    generating with at least one processor a plurality of candidate classifiers, wherein at least some of the plurality of candidate classifiers comprise a majority vote over a plurality of randomly-generated classifiers as applied to the at least one example stored in the memory, wherein the plurality of randomly-generated classifiers has a cardinality that is a function of a size of a margin of the randomly-generated classifiers; and
    generating a boosted classifier that incorporates at least some of the plurality of candidate classifiers.

2. The computer-implemented method of claim 1, wherein generating the plurality of candidate classifiers is performed using a boosting module.

3. The computer-implemented method of claim 2, wherein the boosting module is MadaBoost.

4. The computer-implemented method of claim 2, wherein generating the plurality of candidate classifiers further comprises using the boosting module to repeatedly call a weak learner algorithm that generates the plurality of candidate classifiers.

5. The computer-implemented method of claim 1, wherein generating the boosted classifier is performed iteratively until the accuracy of the boosted classifier exceeds a threshold.

6. The computer-implemented method of claim 1, further comprising:
    generating at least one weak classifier that is selected from the plurality of candidate classifiers based on an error rate realized using the selected one of the plurality of candidate classifiers; wherein the boosted classifier incorporates the at least one weak classifier.

7. The computer-implemented method of claim 6, wherein generating the target classifiers further comprises assigning a weight to the at least one weak classifier.

8. The computer-implemented method of claim 1, wherein the randomly-generated classifiers are determined at least in part using a plurality of independent random vectors whose elements correspond to a plurality of features found in the examples.

9. The computer-implemented method of claim 1, wherein the examples are drawn from a n-dimensional, $\gamma$-margin dataset, and for at least one candidate classifier the majority vote is taken over a plurality of randomly-generated classifiers has a cardinality that is a function of $\log(1/\gamma)$.

10. The computer-implemented method of claim 9, wherein the dataset contains malicious noise at a rate $$\eta \le c\varepsilon\gamma\sqrt{\log(1/\gamma)},$$

wherein c is a constant.

11. An apparatus for generating a classifier from examples in a dataset containing malicious noise, comprising:
    a memory containing at least one of the examples of the dataset, wherein the at least one examples stored in the memory contains malicious noise; and
    a processor having access to the memory, the processor configured to:
    execute a boosting module to repeatedly call a weak learner module that generates as output a plurality of weak classifiers selected from a plurality of candidate classifiers, wherein at least some of the plurality of candidate classifiers comprise a majority vote over a plurality of randomly-generated classifiers as applied to the at least one example stored in the memory, wherein the plurality of randomly-generated classifiers has a cardinality that is a function of a size of a margin of the randomly-generated classifiers; and
    generate a classifier that incorporates at least some of the plurality of weak classifiers.

12. The apparatus of claim 11, wherein the boosting module is a smooth boosting module.

13. The apparatus of claim 11, wherein the boosting module is MadaBoost.

14. The apparatus of claim 11, wherein the processor is further configured so that at least one of the weak classifiers is selected from a plurality of candidate classifiers based on an error rate realized using the selected one of the plurality of candidate classifiers to classify a set of examples drawn from the dataset.

15. The apparatus of claim 11, wherein the weak classifier generates the randomly-generated classifiers using a plurality of random vectors whose elements correspond to a plurality of features found in the examples.

16. A non-transitory computer-readable medium storing a program of instructions executable by one or more machines to perform a method for generating a classifier from examples in a dataset containing malicious noise, the method comprising:
    storing in a computer memory at least one of the examples of the dataset, wherein the at least one examples stored in the memory contains malicious noise;
    repeatedly calling a weak learner module that (i) determines a plurality of randomly-generated classifiers and a plurality of candidate classifiers that comprise a majority vote over at least some of the plurality of randomly-generated classifiers, wherein the plurality of randomly-generated classifiers has a cardinality that is a function of a size of a margin of the randomly-generated classifiers; and (ii) determines a plurality of weak classifiers that are selected from the plurality of candidate classifiers based on the error rate realized using the selected ones of the plurality of candidate classifiers to classify examples drawn from the dataset; and
    generating a target classifier that incorporates at least some of the plurality of weak classifiers.

17. The non-transitory computer-readable medium of claim 16, wherein generating the target classifier further comprises assigning weightings to one or more of the plurality of weak classifiers.

18. The non-transitory computer-readable medium of claim 16, wherein the examples are drawn from a n-dimensional, $\gamma$-margin halfspace, and each time the weak learner module is called, the weak learner module generates a plurality of randomly-generated classifiers having a cardinality that is a function of $\log(1/\gamma)$.

19. The non-transitory computer-readable medium of claim 16, wherein generating the target classifier is performed iteratively until the accuracy of the target classifier exceeds a threshold.

20. The non-transitory computer-readable medium of claim 16, wherein the weak learner module generates the plurality of randomly-generated classifiers using a plurality of random vectors whose elements correspond to a plurality of features found in the examples.

21. The method of claim 1, wherein the dataset contains malicious noise at a rate $\eta$, such that $$c\varepsilon\gamma < \eta \le c\varepsilon\gamma\sqrt{\log(1/\gamma)},$$

wherein c is a constant, $\epsilon$ represents an accuracy parameter, and $\gamma$ indicates a halfspace margin.

* * * * *